United States Patent
Hoshino

(10) Patent No.: US 7,590,308 B2
(45) Date of Patent: Sep. 15, 2009

(54) IMAGE PROCESSING APPARATUS, AN IMAGE PROCESSING METHOD, AND A COMPUTER READABLE MEDIUM HAVING RECORDED THEREON A PROCESSING PROGRAM FOR PERMITTING A COMPUTER TO PERFORM IMAGE PROCESSING ROUTINES

(75) Inventor: Masaru Hoshino, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/033,563

(22) Filed: Feb. 19, 2008

(65) Prior Publication Data

US 2008/0219595 A1 Sep. 11, 2008

Related U.S. Application Data

(63) Continuation of application No. 10/963,623, filed on Oct. 14, 2004, now Pat. No. 7,356,202, which is a continuation of application No. 09/676,490, filed on Oct. 2, 2000, now Pat. No. 6,868,189.

(30) Foreign Application Priority Data

Oct. 1, 1999 (JP) ................................. 11-280907

(51) Int. Cl.
G06K 9/54 (2006.01)
G06K 9/40 (2006.01)
G06K 9/60 (2006.01)
(52) U.S. Cl. ...................................... 382/302; 382/261
(58) Field of Classification Search ......... 382/302–304, 382/260–266, 274, 275
See application file for complete search history.

(56) References Cited

U.S. PATENT DOCUMENTS

| 4,833,625 | A | 5/1989 | Fisher et al. |
| 5,111,286 | A | 5/1992 | MacDonald et al. |
| 5,283,671 | A | 2/1994 | Stewart et al. |
| 5,657,477 | A | 8/1997 | Nonoshita et al. |
| 5,907,667 | A | 5/1999 | Shiraishi |
| 6,522,418 | B2 | 2/2003 | Yokomizo et al. |
| 6,667,815 | B1 * | 12/2003 | Nagao ........................ 358/1.9 |
| 6,868,189 | B1 * | 3/2005 | Hoshino ..................... 382/260 |

(Continued)

FOREIGN PATENT DOCUMENTS

EP 0 443 851 A1 8/1991

(Continued)

OTHER PUBLICATIONS

Translation of JP 8-101908.*

Primary Examiner—Wesley Tucker
(74) Attorney, Agent, or Firm—Sughrue Mion, PLLC

(57) ABSTRACT

In order to provide an image processing apparatus and an image processing method whereby a high quality output image can be consistently obtained, regardless of the order in which an operator sets the parameters for the performance of filtering, (I) a GUI module (9a) stores, in an input value storage area (9p) of a RAM, reference signs that are employed for first to fourth processes for the filtering of reduced image data, and (II) a filtering module (9f) refers to the reference signs in the input value storage area (9p) when performing the first to the fourth processes for the filtering of input image data, and obtains output image data.

15 Claims, 10 Drawing Sheets

U.S. PATENT DOCUMENTS 7,356,202 B2 * 4/2008 Hoshino ..................... 382/303

FOREIGN PATENT DOCUMENTS

| EP | 0 559 376 A1 | 9/1993 |
| EP | 0 786 896 A2 | 7/1997 |
| JP | 6-333006 A | 2/1994 |
| JP | 8-101908 | 4/1996 |
| JP | 10-313399 A | 11/1998 |
| JP | 11-185034 | 7/1999 |
| WO | 92/20184 | 11/1992 |

* cited by examiner

IMAGE PROCESSING APPARATUS, AN IMAGE PROCESSING METHOD, AND A COMPUTER READABLE MEDIUM HAVING RECORDED THEREON A PROCESSING PROGRAM FOR PERMITTING A COMPUTER TO PERFORM IMAGE PROCESSING ROUTINES

This is a continuation of application Ser. No. 10/963,623 filed Oct. 14, 2004, which is a Continuation Application of U.S. application Ser. No. 09/676,490 filed Oct. 2, 2000. The entire disclosures of the prior applications, application Ser. Nos. 10/963,623 and 09/676,490, are hereby incorporated by reference in their entirety.

BACKGROUND OF THE INVENTION

1. Field of the Invention

The present invention relates to an image processing apparatus and an image processing method. More particularly, the present invention relates to a digital image filtering apparatus and a digital image filtering method. Further, the present invention relates to a recording medium, such as a computer readable medium, having recorded thereon a processing program for permitting a computer to perform image processing routines.

The present application is based on Japanese Patent Application No:. Hei. 11-280907, which is incorporated herein by reference.

2. Description of the Related Art

Conventionally, using filters to change the image quality of digital image data that are output is a well known process. In this explanation, unless otherwise specified, filtering represents a concept that includes spatial filtering, tone correction and gray level correction processes. Enhancement filtering, for example, which is a kind of spatial filtering, is a process for emphasizing the contrast between adjacent pixels to enhance detailing, such as at edges, around corners and along lines.

Generally, when an image processing application performs multiple kinds of filtering, these processes are performed in the order corresponding to that stipulated by an operator for the parameters established to perform the filtering, until finally, the results are output to a display. Thus, when for such an application an operator sets in a specific order parameters for spatial filtering and for gray level correction, for example, the processing is performed in that order. In addition, an operator may, while confirming the quality of an image output to a display, change the parameters for the performance of filtering by determining which parameters to use to obtain a desired image quality for the output of an image to a printer.

When the filtering of image data is performed, generally, as a result of the processing involved, color information and spatial information are reduced. For example, when the number of gray levels is reduced or increased to alter the brightness of an HSB (Hue, Saturation, and Brightness) model, two pixels that before the processing had different brightness levels may both have the same level after the processing has been completed. Also, a reduction in the total amount of color information, which is accomplished by employing a number of different processes for filtering, varies in consonance with the order in which the processes are performed. Therefore, the quality of the image data that is output fluctuates, depending in large part on the order in which filtering parameters are designated by a user.

SUMMARY OF THE INVENTION

To resolve this problem, it is an object of the present invention to provide an image processing apparatus and an image processing method whereby the data that are output consistently ensure that a high quality image will be obtained, regardless of the order in which the parameters for the filtering are set.

According to the present invention, an image processing apparatus includes:

a storage device which stores input image data in a first area;

a refuging device which stores, in a second area of the storage device, sample image data produced from the input image data that has been stored in the first area; and a pseudo display device which outputs, to a display, pseudo image data obtained by performing a number of different processes for filtering the sample image data stored in the second area. Therefore, when a process for performing the filtering has been determined, the results obtained by the filtering can be displayed on a screen without the input image data having to be processed. The sample image data, for which the input image data were employed as source data, can be, for example, data duplicating the input image data, data obtained by reducing the input data, or thumbnail image data produced using the input data.

A parameter registration device stores, in a third area of the storage device, parameters that are to be referred to for each kind of process that is performed for filtering the sample image data in the second area. While referring to the parameters in the third area, a filtering device performs, in a predetermined order, a number of different processes for filtering the input image data in the first area to obtain image data for output. Therefore, regardless of the order in which an operator designates the parameters for the filtering, different kinds of processes can be performed in the order that best provides an improved quality image. In other words, high quality image data can be consistently output.

The parameters used for the process for filtering the input image data need not be the same as those used for the process for filtering the sample image data. For example, for the processes used for filtering input image data and simulated image data, by referring to the parameters stored in the third area, new parameters may be obtained in accordance with the print size or the display size of an output image, and these new parameters may be used to perform the process for filtering the input image data or the sample image data. Here, the storage device is a conceptual representation that includes a main storage device and an auxiliary storage device.

According to the present invention, the filtering device sequentially performs, in accordance with an order established to minimize color information and spatial information reductions, a number of different processes for filtering the input image data. As a result, the output image quality is improved.

According to the present invention, for the input image data stored in the first area, the filtering device performs, in the named order, a tone curve correction process for an RGB model, a saturation correction process for an HSB model, and a spatial filtering correction process. Therefore, color information and spatial information reductions due to filtering can be minimized.

According to the present invention, the pseudo display device performs the number of different processes, in the same order as having been employed for the processes performed in the first area for the input image data, to filter the sample image data in the second area. As a result, a displayed image, which was obtained by performing the processes for filtering the sample image data, can approximate the output results obtained with the image data.

According to the present invention, the refuging device generates the sample image data by reducing a size of the input image data stored in the first area, and stores the sample image data in the second area of the storage device. Since the size of the sample image data is smaller than is that of the input image data, less time is required to display the results obtained by the filtering, which is performed in accordance with the parameters.

Further, according to the present invention, an image processing method or a computer readable medium having recorded thereon a processing program for permitting performance of a computer, is provided. The image processing method, or the processing program, includes the steps of:

storing, in a second area on a storage device, sample image data produced from input image data that has been stored in a first area of the storage device; and outputting, to a display, pseudo image data obtained by performing a variety of processes to filter the sample image data stored in the second area. Therefore, since a variety of processes are performed when the sample image data are filtered, the obtained results can be reflected in the processing performed for the input image data. Further, parameters that are referred to for each process, when the filtering of the sample image data in the second area is performed, are stored in a third area of the storage device. By referring to these parameters, the various filtering processes can be performed in a predetermined order for filtering the input image data in the first area, and output image data can be obtained. Therefore, regardless of the order in which the parameters for filtering are designated by an operator, the order in which the various processes are performed is the one that can best improve the output image quality. In other words, high quality image data can be consistently output.

According to the present invention, the order in which a variety of processes, for filtering the input image data in the first area, are sequentially performed to minimize the reduction in color information and in spacial information, and thereby improves the quality of the image that is output.

According to the present invention, corrective filtering for the input image data in the first area is performed in order in consonance with the sequential arrangement of tone curve correction for an RGB model, saturation correction for an HSB model in the input image data, and spatial information correction. As a result, a reduction in color information and in spatial information due to filtering can be minimized.

According to the present invention, the number of different processes are performed for filtering the sample image data in the second area in the same order as that used for the processes performed for filtering the input image data in the first area. Thus, a displayed image obtained by performing the filtering for the sample image data can approximate the results provided for the output image data.

According to the present invention, the sample image data is generated by reducing a size of the input image data in the first area and storing the resultant data in the second area of the storage device. Since the size of the sample image data is smaller than that of the input image data, the time required to display the results obtained by the filtering performed in accordance with the parameters can be reduced.

DETAILED DESCRIPTION OF THE PREFERRED EMBODIMENT

A preferred embodiment of the present invention now will be described with reference to FIGS. 1 to 10.

Figure 1:
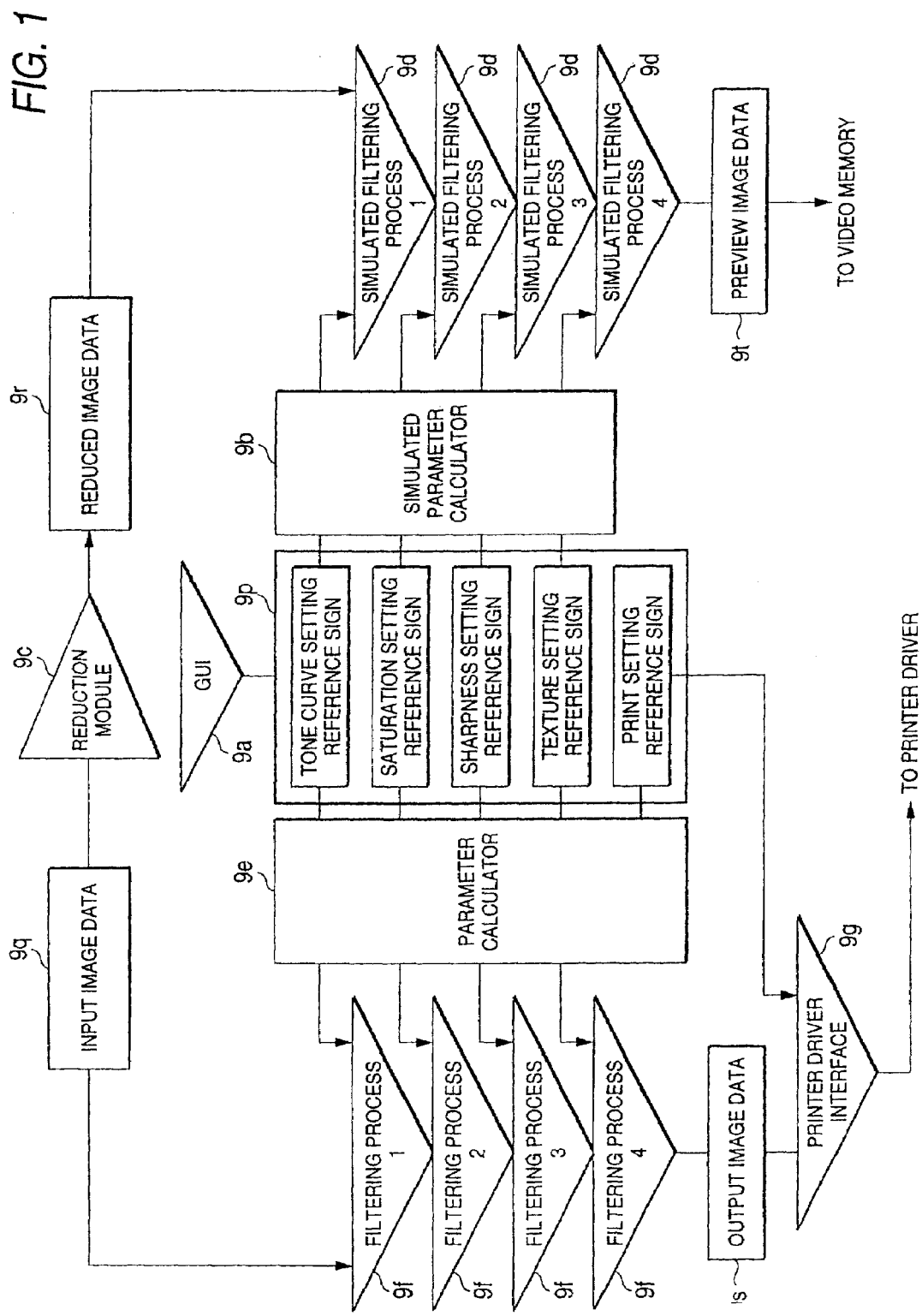
FIG. 1 is a specific diagram illustrating the correlation among individual modules of an image processing apparatus according to one embodiment of the present invention.
Figure 2:
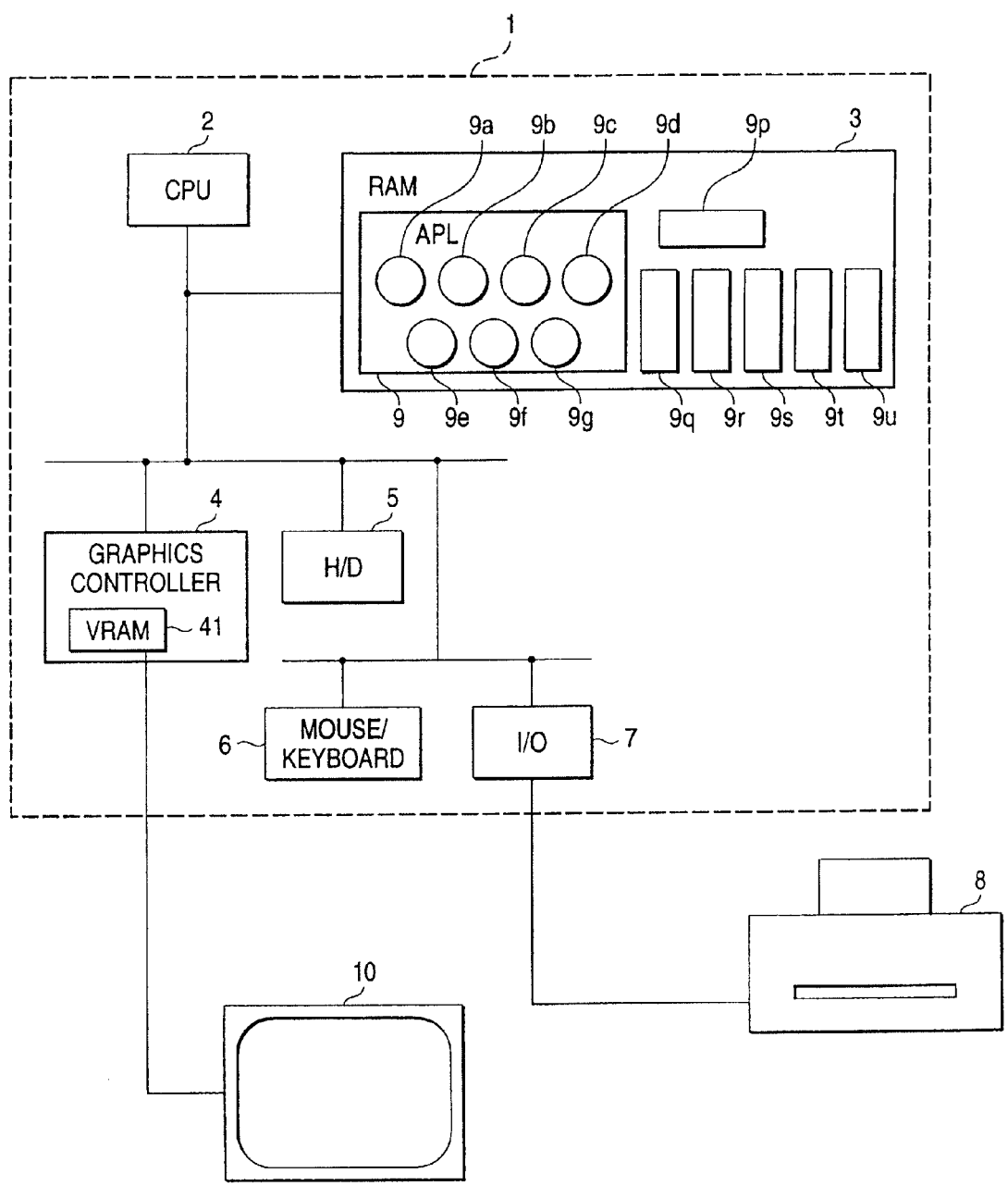
FIG. 2 is a block diagram illustrating an image processing system according to the embodiment of the present invention.

FIG. 2 is a diagram showing an image processing system that employs, as the nucleus of the system, an image processing apparatus 1 according to this embodiment. The image processing system comprises the image processing apparatus 1, a printer 8 and a display device 10.

A CPU (Central Processing Unit) 2 and a RAM (Random Access Memory) 3, which is a storage device, are interconnected by a memory bus via a PCI memory control chip set (not shown). The memory bus is connected to a high-speed bus, which in turn is connected to peripheral devices, such as a graphics controller 4 and a hard disk 5, for which high speed processing is required. The high-speed bus itself is connected to a low-speed bus via a bridge circuit (not shown). And connected to the low-speed bus is an input unit 6, such as a mouse or a keyboard, and an interface 7.

Under the control of an operating system (hereinafter referred to as an OS), the image processing apparatus 1 executes an image processing application 9, which is loaded into the RAM 3, and outputs image data to the graphics controller 4 and to the printer 8. The image processing application 9 will now be described while referring to FIGS. 1 and 2.

The image processing application 9 comprises a graphical user interface module (hereinafter referred to as a GUI module) 9a, a parameter calculation module 9e, a filtering module 9f, a printer driver interface module (hereinafter referred to as a PDI module) 9g, a reduction module 9c, a simulated parameter calculation module 9b and a simulated filtering module 9d. Further, the image processing application 9 acquires, in the RAM 3, an input value storage area 9p, used to store a value entered by an operator when the application 9 is executed; an input image data storage area 9q, used to store input image data that are retrieved from the hard disk 5; an output image data storage area 9s, used to store output image data; a reduced image data storage area 9r, used to store reduced image data that serve as sample data; a preview image data storage area 9t, used to store preview image data that serve as pseudo image data; and a thumbnail data storage area 9u, used to store thumbnail data for the input image data. Values that are entered by an operator and are stored in the input value storage area include: a tone curve setting reference sign, a saturation setting reference sign, a sharpness effect setting reference sign, a special effect setting reference sign and a texture setting reference sign, all of which are referred to by the parameter calculation module 9e and the simulated parameter calculation module 9b, and a print setting reference sign, which is referred to by the parameter calculation module 9e and the PDI module 9g.

The GUI module 9a, which is executed by the CPU 2 and serves as a parameter registration device, is a processing program for outputting to the display device 10 the operating screens shown in FIGS. 4 to 10, for storing in the input value storage area 9p a value that is entered by the operator using the input unit 6, and for issuing to the graphic interface of the OS a drawing command for the preview image data.

The parameter calculation module 9e is a processing program for calculating parameters that are used, in the processing for the filtering of input image data, by referring to the tone curve setting reference sign, the saturation setting reference sign, the sharpness effect setting reference sign, the special effect setting reference sign, the texture setting reference sign and the print setting reference sign, which are stored in the input value storage area 9p by the GUI module 9a, and for transmitting these parameters to the filtering module 9f.

The filtering module 9f, which is executed by the CPU 2 and serves as a filtering device, is a processing program for sequentially performing, based on the parameters received from the parameter calculation module 9e, the following filtering processes for the input image data.

(1) First process for using filtering to change the tone curve of an RGB (Red, Green and Blue) model for image data.

(2) Second process for using filtering to change the saturation of an HSB (Hue, Saturation, and Brightness) model for image data.

(3) Third process for performing spatial filtering to enhance or provide shading for the outline of an image.

(4) Fourth process for performing calculations to generate a regularly textured image.

The individual processes will now be explained.

For the first process, the parameter obtained by using the tone curve setting reference sign is employed for the filtering performed to change the tone curve of image data (RGB model) and to correct the intensity levels of the RGB colors.

For the second process for performing filtering, the resultant image data (RGB model) provided by using the first process are converted into an HSB model, and the parameter obtained by using the saturation setting reference sign is employed for the filtering performed to correct the saturation level of the image data of the HSB model.

For the third process for performing filtering, the resultant image data (HSB model) provided by using the second process are converted into an RGB model, and the parameter obtained by using the sharpness effect setting reference sign is employed for the filtering performed to extract a correction target pixel in accordance with a threshold value designated by an operator. The radial correction range for a target pixel is determined in accordance with the width of the outline designated by the operator. Then, the contrast is enhanced in accordance with a distance for the range designated by the operator.

For the fourth process for performing filtering, the intensity levels of the RGB colors in the image data (RGB model) provided by the third process are corrected at regular intervals in raster space, so that the pattern of the texture that is determined in accordance with the texture setting reference sign can be represented on the output image.

This completes the explanation of the filtering processes.

The PDI module 9g is a processing program for transmitting to a printer driver, via the graphics interface of the OS, the output image data obtained by the filtering module 9f, and a drawing command for the output image data.

The reduction module 9c, which when executed by the CPU 2 serves as a refuging device, is a processing program for reducing the size of the input image data to obtain sample image data for 400×400 pixels, and for storing the sample image data in the reduced image data storage area. When, for example, the input image data is 1600×1200 pixels, the reduction module 9c performs a 1/16 input image data pixel reduction to obtain a pixel count of 400×300, and stores the obtained image data in the reduced image data storage area 9r.

The simulated parameter calculation module 9b is a processing program for calculating a parameter that is used for the filtering of the reduced image data, while referring to the filtering setting reference sign that is stored in the input value storage area 9p, and for transmitting the parameter to the simulated filtering module 9d. The parameter is so obtained by the simulated parameter calculation module 9b that visually the resultant data acquired through the filtering of the input image data are substantially the same as the reduced data obtained through the filtering of the image data.

The simulated filtering module 9d, which when executed by the CPU 2 serves as a simulation display device, is a processing program for performing the first to the fourth processes for the filtering of the reduced image data based on the parameter received from the simulated parameter calculation module 9b. The code that is loaded into the CPU 2 when the simulated filtering module 9d performs the first to the fourth processes is substantially the same as the code that is loaded when the filtering module 9f performs the first to the fourth processes.

An explanation will now be given for the operation of the image processing apparatus 1 when performing the process for the filtering of the input image data in accordance with the procedures in FIG. 3, and for the output of the resultant image data to the printer 8.

Step 10

Figure 4:
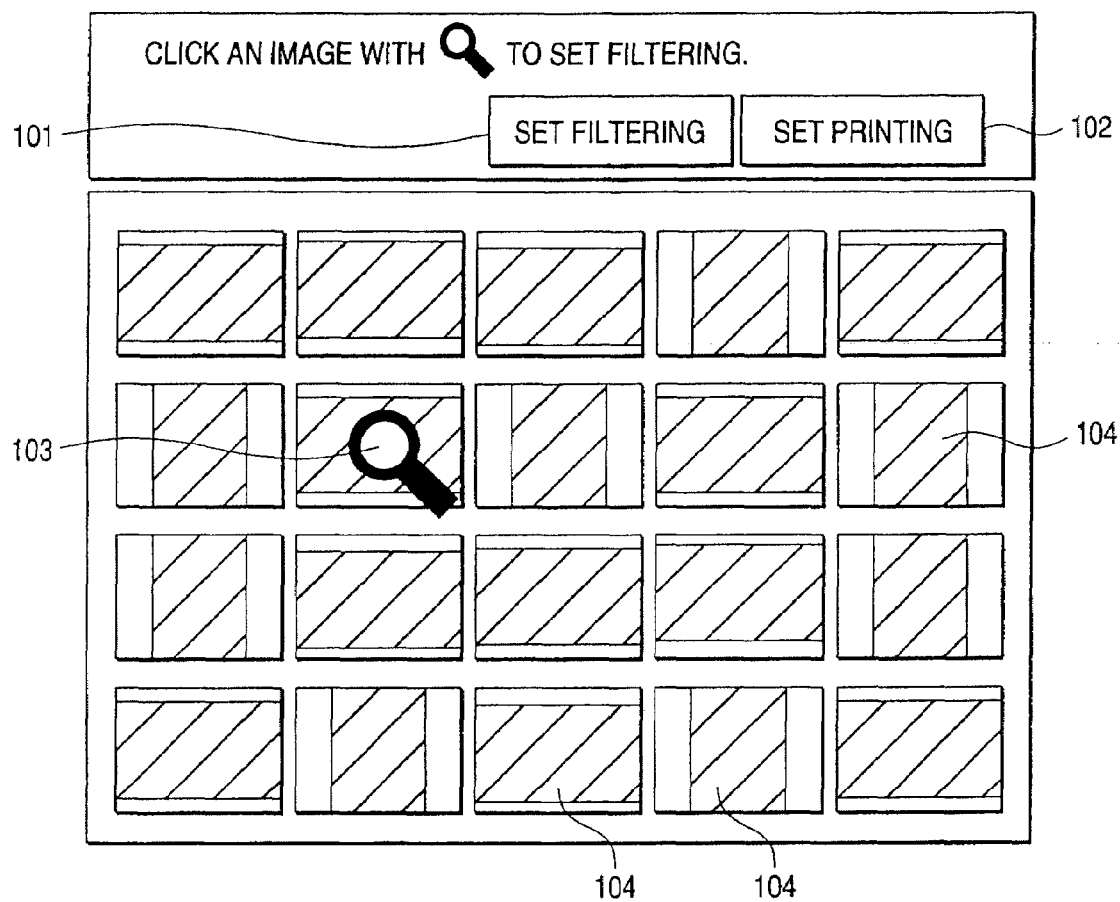
FIG. 4 is a specific diagram showing a screen displayed by the image processing system according to the embodiment.

When the image processing application 9 is loaded into the RAM 3, the GUI module 9a stores a default value in the input value storage area 9p, loads into the thumbnail storage area 9u the thumbnail data for image data that are stored in an auxiliary storage device, such as the hard disk 5, issues a drawing command to the graphics interface of the OS, transmits the thumbnail data to a video memory 41, and displays a screen shown in FIG. 4 on the display device 10.

The thumbnail data that are loaded into the thumbnail storage area 9 from the hard disk 5 are output to the screen in FIG. 4, and an image consisting of 20 frames is displayed. The number of pixels in one of the images 104 displayed by using the thumbnail data is 160×120, in accordance with, for example, JPEG (Joint Photographic Coding Experts Group). On this screen, it is possible to select the filtering setting or the print setting that is to be performed. When an image 104 is selected by using a pointer that intermeshes with the movement of the mouse, the filtering setting can be designated for image data corresponding to the selected image 104. When an image 104 is selected, the GUI module 9a stores, in the input value storage area 9p, the address of the image data that corresponds to the selected image 104.

Step 20

When a filtering setting switch 101 is selected, the GUI module 9a loads, into the input image data storage area 9q, image data stored at an address in the input value storage area 9p. The reduction module 9c generates reduced image data by reducing the input image data, and stores the thus obtained image data in the reduced image data storage area 9r. The GUI module 9a then issues a drawing command to the graphics interface of the OS, and displays the screen shown in FIG. 5 on the display device 10.

Figure 5:
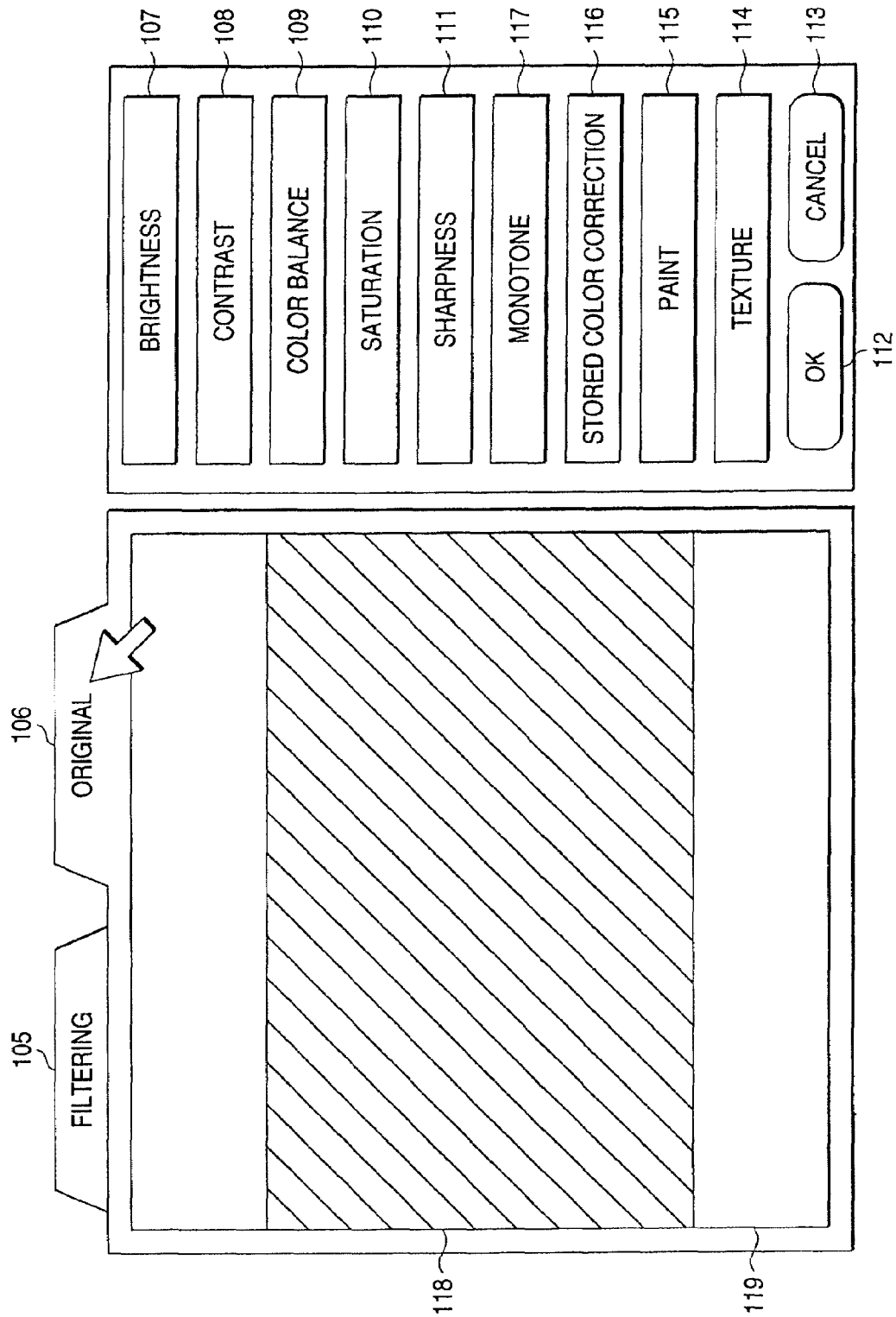
FIG. 5 is a specific diagram showing a screen displayed by the image processing system according to the embodiment.

The screen in FIG. 5 is divided into a left display area, for a reduced image 118, and a right display area, for switches 107 to 111 and 114 to 117, to facilitate the selection of a process.

Before a selected process for filtering is performed, the same contents are shown in the left display area of the screen by selecting either a filter tab 105 or an original tab 106. When either tab is selected, the reduced image 118 is displayed in a reduced image display area 119 of 400×400 pixels. Thus, when the GUI module 9a transmits the reduced image data from the reduced image data storage area 9r to the video memory 41, the reduced image 118 is displayed.

Figure 6:
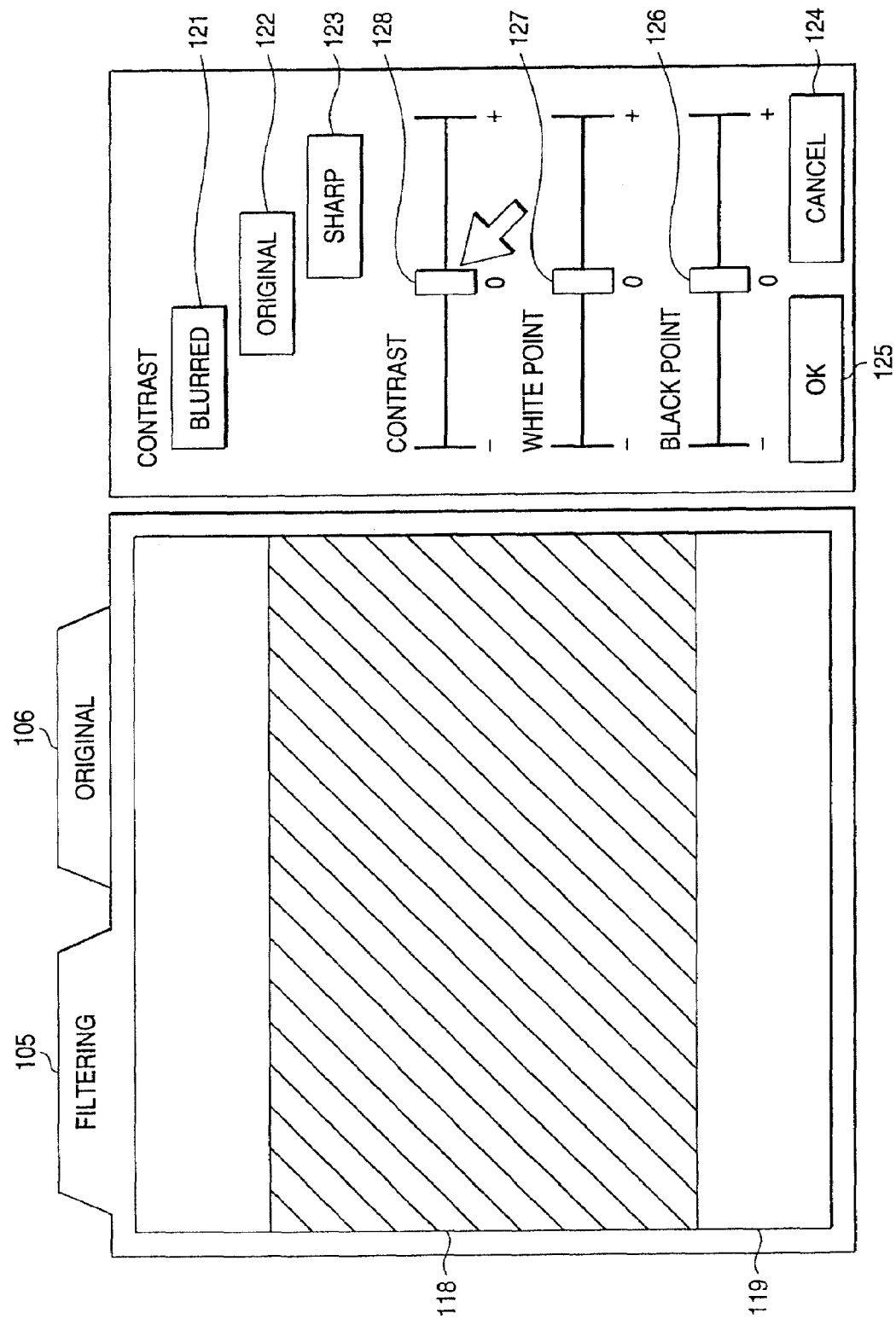
FIG. 6 is a specific diagram showing a screen displayed by the image processing system according to the embodiment.

In the right display area of the screen, the switches 107 to 111 and 114 to 117 are displayed to enable the selection of one of the effects provided by the first to the fourth processes that is to be reflected by the output image. When one of the switches is selected, the contents in the right display area are changed as is shown in FIG. 6. Thus, when the brightness switch 107, the contrast switch 108 or the color balance switch 109 is selected, a screen appears for the setting of a parameter required for the first process for performing filtering. When the saturation switch 110 is selected, a screen appears for the setting of a parameter required for the second process performed for filtering. When the sharpness switch 111 is selected, a screen appears for the setting of a parameter required for the third process performed for filtering. And when the texture switch 114 is selected, a screen appears for the setting of a parameter required for the fourth process performed for filtering. It should be noted that the left display area on the screen is not changed, regardless of which switch is selected.

Step 30

(1) Setting of the First Filtering Process

To designate the first process for the filtering of an input image, on the screen displayed by selecting the brightness switch 107, the contrast switch 108 or the color balance switch 109 in FIG. 5, the operator employs the GUI module 9a to change the tone curve setting reference sign stored on the input value storage area 9p.

When the contrast switch 108 is selected, the screen in FIG. 6 appears. On this screen, the tone curve setting reference sign can be altered to change the brightness level of the entire image. A slide switch 128 is used to change the tone curve setting reference sign that is referred to in the first filtering process, so that the tone is changed in accordance with the brightness of the pixels, e.g., a bright pixel becomes brighter or a dark pixel becomes darker. A slide switch 127 is used for changing the tone curve setting reference sign, which is referred to during the first process, so that the brightness value limit for a bright pixel is changed. A slide switch 126 is used to change the tone curve setting reference sign, which is referred to during the first process, so that the darkness value limit for a dark pixel is changed. Preset switches 121, 122 and 123 are used to move the slide switches 126, 127 and 128 to predetermined positions and to set the tone curve setting reference signs that are determined in advance.

When the operator manipulates the preset switch 121, 122 or 123, or the slide switch 126, 127 or 128, one of the following simulated filtering process is performed for the reduced image data.

(i) In accordance with the manipulation performed by the operator, the GUI module 9a changes a part of the tone curve setting signs stored in the input value storage area 9p. Further, before the operator manipulates the preset switch 121, 122 or 123, or the slide switch 126, 127 or 128, the GUI module 9a moves the tone curve setting reference sign from the input value storage area 9p to another area, so that the tone curve setting reference sign is returned to the previous state.

(ii) The simulated parameter calculation module 9b refers to the tone curve setting reference sign, the saturation setting reference sign, the sharpness setting reference sign and the texture setting reference sign for generating parameters used for the first to the fourth processes, and transmits the obtained parameters to the simulated filtering module 9d. By using these parameters, the simulated filtering module 9d sequentially performs the first, the second, the third and the fourth processes for the filtering of the reduced image data to generate the preview image data, and stores the previous image data in the preview image data storage area 9t.

The processing for the display of an image in the left display area of the screen will now be explained.

When the original tab 106 is selected, the GUI module 9a issues a drawing command to the graphics interface of the OS, transmits the reduced image data to the video memory 41, and displays, in the reduced image display area 119, the reduced image 118 that has not yet been subjected to filtering.

When the filter tab 105 is selected, the GUI module 9a issues a drawing command to the graphics interface of the OS, transmits the preview image data to the video memory 41, and displays, in the reduced image display area 119, the reduced image 118 that has been subjected to filtering.

When an OK switch 125 is selected, the GUI module 9a changes the right display area of the screen of the display device 10 to the screen shown in FIG. 5.

When the cancel switch 124 is selected, the GUI module 9a returns to the input value storage area 9p the filtering setting reference sign that has been stored in the GUI module 9a, and displays the screen in FIG. 5 on the display device 10.

When the original tab 106 on the screen in FIG. 5 is selected, the GUI module 9a issues a drawing command to the graphics interface of the OS, transmits the reduced image data to the video memory 41, and displays the reduced image 118.

When the filter tab 105 is selected on the screen in FIG. 5, the GUI module 9a issues a drawing command to the graphics interface of the OS, transmits the preview image data to the video memory 41, and displays the reduced image 118.

(2) Setting the Second Process

Figure 7:
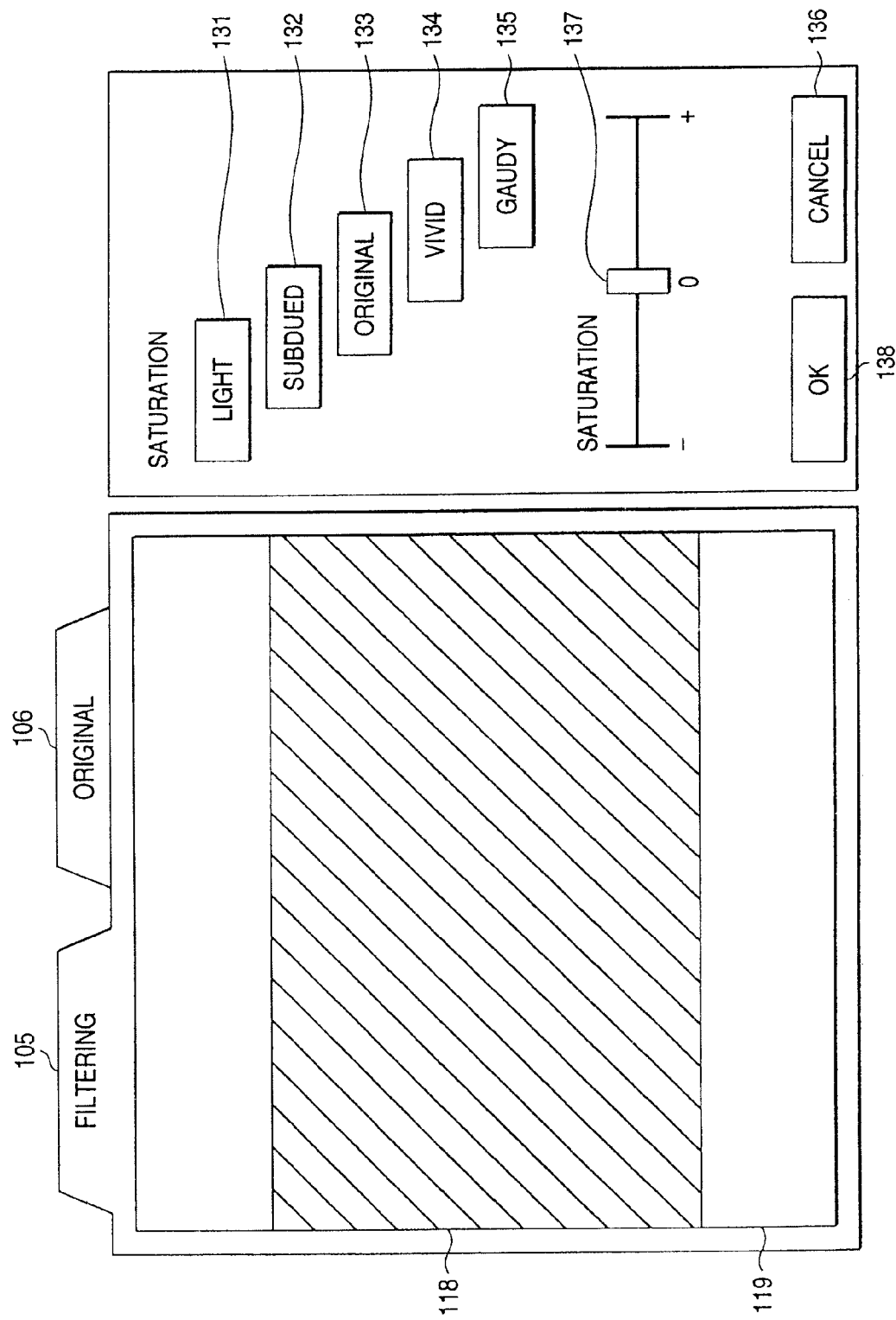
FIG. 7 is a specific diagram showing a screen displayed by the image processing system according to the embodiment.

To designate the second process for the filtering of an input image, on a screen in FIG. 7 that is displayed when the saturation switch 110 is selected on the screen in FIG. 5, the operator employs the GUI module 9a to change the saturation setting reference sign stored in the input value storage area 9p.

A slide switch 137 is used to change the saturation setting reference sign that is to be referred to in the second process, so that the saturation levels of all the pixels are changed. Preset switches 131 to 135 are used to move the slide switch 137 to a predetermined position to set the saturation setting reference sign that is determined in advance.

When the operator manipulates one of the preset switches 131 to 135 or the slide switch 137, the following simulated process is performed to filter the reduced image data.

(i) In accordance with a manipulation performed by an operator, the GUI module 9a changes a part of the saturation setting reference sign in the input value storage area 9p. Further, before the operator manipulates one of the preset switches 131 to 135 or the slide switch 137, the GUI module 9a moves the saturation setting reference sign from the input value storage area 9p to another area, so that the saturation setting reference sign can be returned to its previous state.

(ii) The simulated parameter calculation module 9b refers to the tone curve setting reference sign, the saturation setting reference sign; the sharpness setting reference sign and the texture setting reference sign to generate parameters used for the first to the fourth filtering processes, and transmits the obtained parameters to the simulated filtering module 9d. By using these parameters, the simulated filtering module 9d sequentially performs the first, the second, the third and the fourth filtering processes for the reduced image data, and generates the preview image data and stores the previous image data in the preview image data storage area 9t.

The procedure for displaying an image in the left display area of the screen is performed in the same manner as is the procedure for setting the first process for performing filtering.

(3) Setting of the Third Process for Performing Filtering

Figure 8:
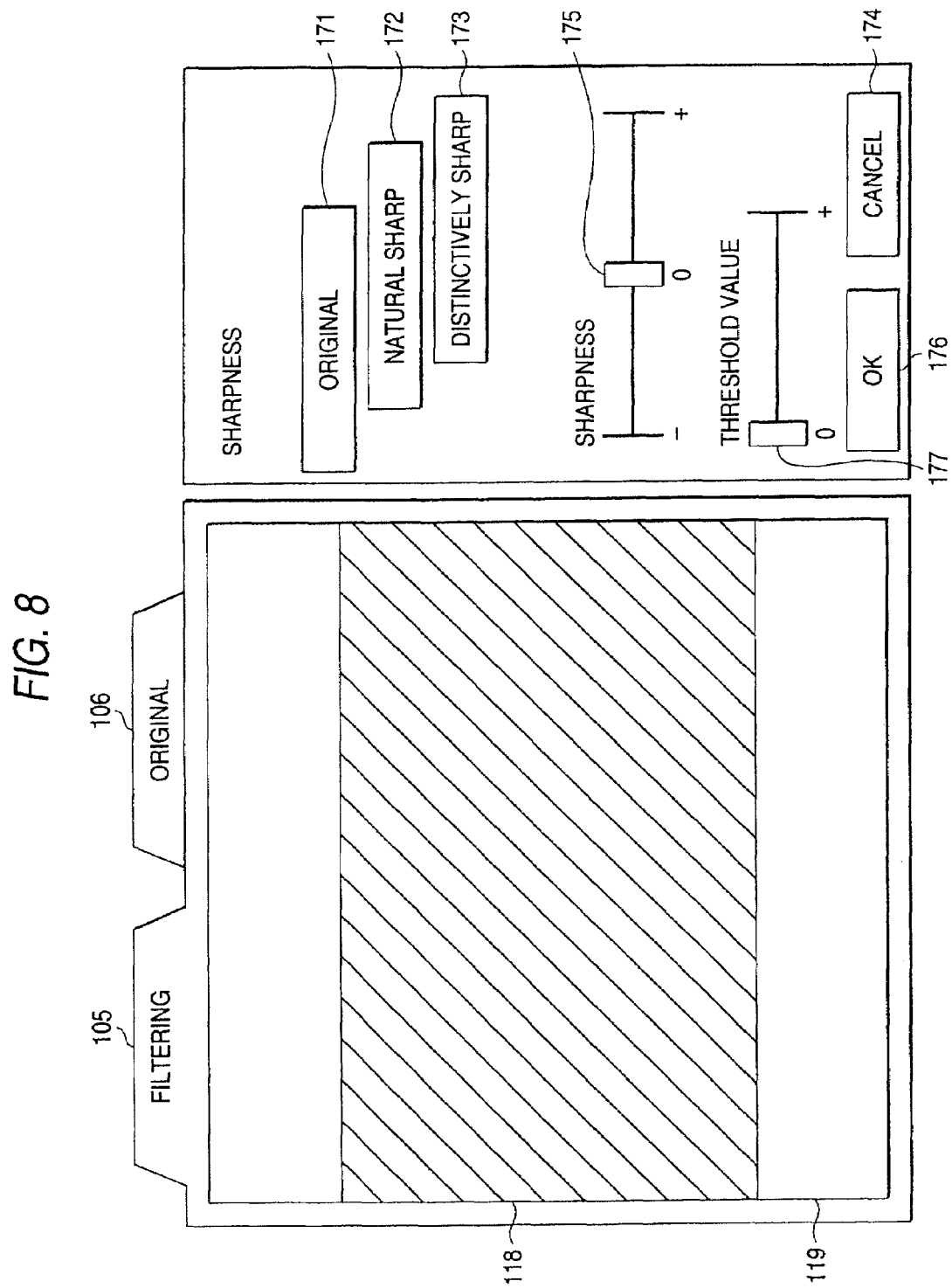
FIG. 8 is a specific diagram showing a screen displayed by the image processing system according to the embodiment.

To designate, on a screen in FIG. 8 that is displayed when the sharpness switch 111 is selected on the screen in FIG. 5, the third process for the filtering of an input image, an operator employs the GUI module 9a to change the sharpness setting reference sign stored in the input value storage area 9p.

A slide switch 175 is used to change the sharpness setting reference sign that is to be referred to in the third process, so that the contrast enhancement level is changed. A slide switch 177 is used to change the sharpness setting reference sign that is to be referred to in the third process, so that, when a target pixel for changing the contrast with an adjacent pixel is extracted, the threshold value for the contrast between the target pixel and its adjacent pixel is changed. Preset switches 171, 172 and 173 are used to move the slide switch 175 to a predetermined position to set for the sharpness setting reference sign setting a level that has been determined in advance.

When an operator manipulates the preset switch 171, 172 or 173 or the slide switch 175, the following simulated process is performed to filter the reduced image data.

(i) In accordance with the manipulation performed by the operator, the GUI module 9a changes a part of the sharpness setting reference sign in the input value storage area 9p. Further, before the operator manipulates one of the preset switches 171 to 173 or the slide switch 175, the GUI module 9a moves the sharpness setting reference sign from the input value storage area 9p to another area, so that the sharpness setting reference sign can be returned to its previous state.

(ii) The simulated parameter calculation module 9b refers to the tone curve setting reference sign, the saturation setting reference sign, the sharpness setting reference sign and the texture setting reference sign to generate parameters for use for the first to the fourth processes for performing filtering, and transmits the obtained parameters to the simulated filtering module 9d. By using these parameters, the simulated filtering module 9d sequentially performs the first, the second, the third and the fourth processes to filter the reduced image data and to generate the preview image data, and stores the previous image data in the preview image data storage area 9t.

The procedure performed for displaying an image in the left display area of the screen is performed in the same manner as is the procedure for setting the first process for performing filtering.

(4) Setting of the Fourth Process for Performing Filtering

Figure 9:
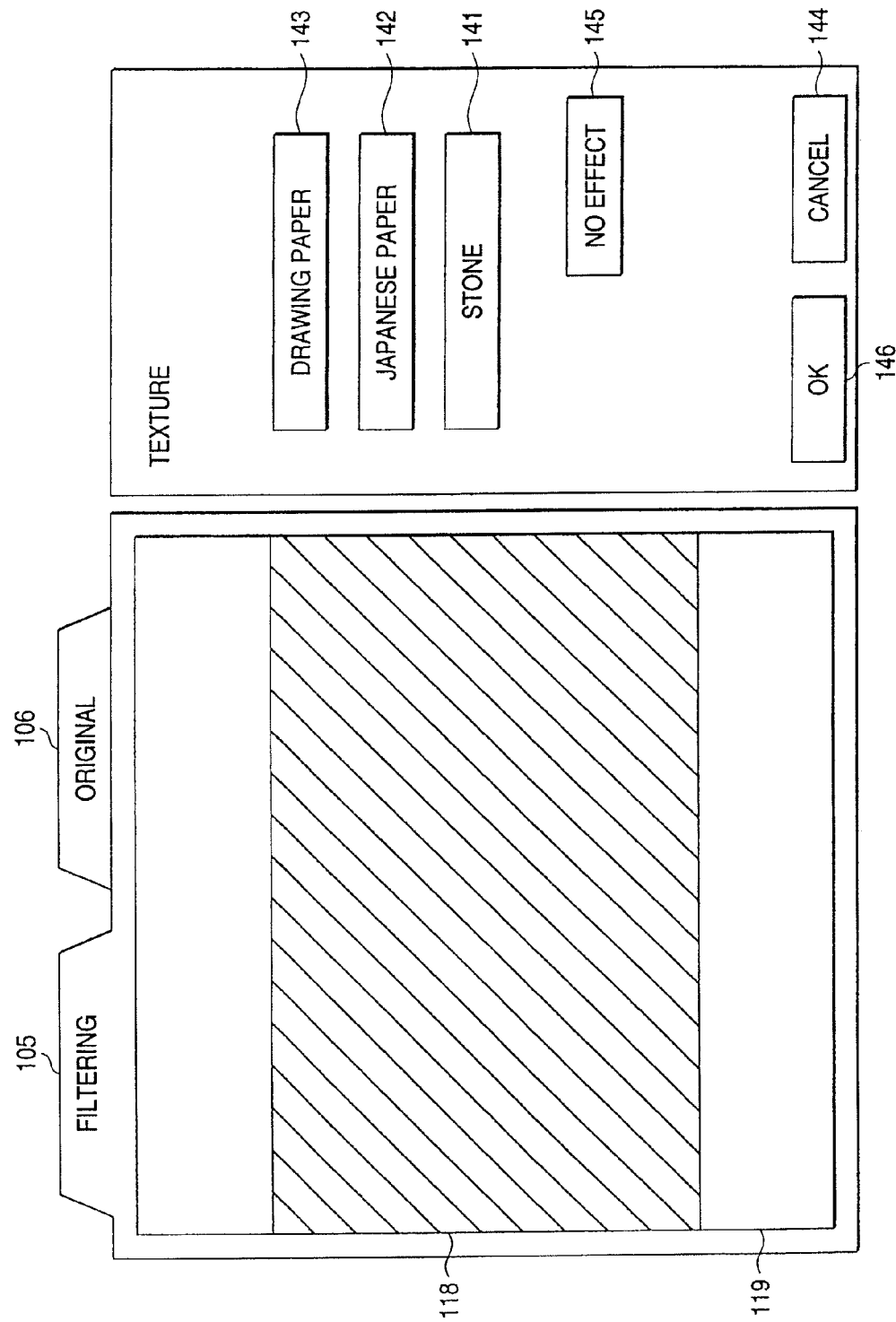
FIG. 9 is a specific diagram showing a screen displayed by the image processing system according to the embodiment.

To designate the fourth process for filtering an input image, on a screen in FIG. 9 that is displayed when the texture switch 113 is selected on the screen in FIG. 5, an operator employs the GUI module 9a to change the texture setting reference sign stored in the input value storage area 9p.

Texture switches 141, 142 and 143 are used to change the texture setting reference sign and to determine the size of a regular pattern, for which the brightness levels are uneven, that is generated for an output image. When an operator manipulates the texture switch 141, 142 or 143, the following simulated process is performed to filter reduced image data.

(i) In accordance with the manipulation performed by the operator, the GUI module 9a changes a part of the texture setting reference sign in the input value storage area 9p. Further, before the operator manipulates one of the preset switches 141 to 143, the GUI module 9a moves the texture setting reference sign from the input value storage area 9p to another area, so that the texture setting reference sign can be returned to its previous state.

(ii) To generate parameters to be used for the first to the fourth processes performed for filtering, the simulated parameter calculation module 9b refers to the tone curve setting reference sign, the saturation setting reference sign, the sharpness setting reference sign and the texture setting reference sign, and thereafter transmits the obtained parameters to the simulated filtering module 9d. By using these parameters, the simulated filtering module 9d sequentially performs the first, the second, the third and the fourth processes for filtering the reduced image data and generating the preview image data, and stores the previous image data in the preview image data storage area 9t.

The procedure employed for displaying an image in the left display area of the screen is performed in the same manner as is the procedure used to set the first filtering process.

When the above processing is completed and the OK switch 112 on the screen in FIG. 5 is selected, the GUI module 9a issues a drawing command to the graphics interface of the OS, transits the thumbnail data to the video memory 41, and displays the screen shown in FIG. 4 on the display device 10.

When the cancel switch 113 on the screen in FIG. 5 is selected, the GUI module 9a returns all the filtering setting reference signs in the input value storage area 9p to their default values. The GUI module 9a then issues a drawing command to the graphics interface of the OS, transmits the thumbnail data to the video memory 41, and displays the screen in FIG. 4 on the display device 10.

Step 40

Figure 10:
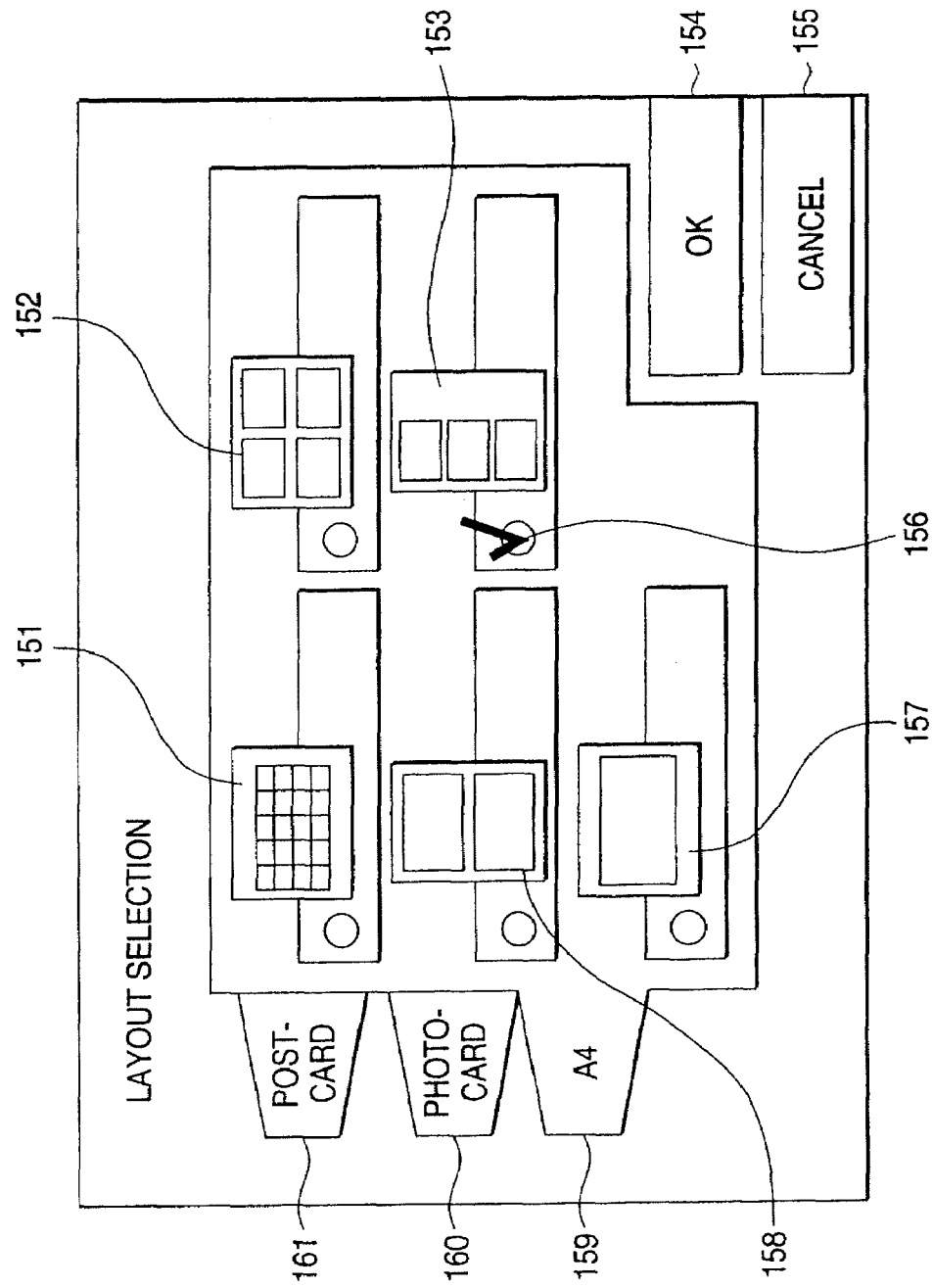
FIG. 10 is a specific diagram showing a screen displayed by the image processing system according to the embodiment.

When the print setting switch 102 on the screen in FIG. 4 is selected, the GUI module 9a issues a drawing command to the graphics interface of the OS and displays a screen shown in FIG. 10 on the display device 10.

On this screen, the print paper size and the layout of an image designated by an operator can be set.

When a postcard tab 161, a photocard tab 160 or an A4 tab 159 is selected, a paper size corresponding to the selected tab is set, and icons 151, 152, 153, 157 and 158 are displayed to represent the available layouts for the pertinent paper sizes, and a check mark 156 is displayed to indicate an icon that was selected by an operator. When in this case the tab is selected, the GUI module 9a changes the print setting reference sign that corresponds to the parameter used to determine the paper size; and when an icon is selected, the GUI module 9a changes the print setting reference sign that corresponds to the parameter used to determine the layout.

Step 50

When an OK switch 154 is selected on the screen in FIG. 10, the image processing application 9 performs the filtering and the printing of the input image data in the following procedures.

To generate parameters used for the first to the fourth filtering processes, the parameter calculation module 9e refers to the tone curve setting reference sign, the saturation setting reference sign, the sharpness setting reference sign and the texture setting reference sign, and thereafter transmits the obtained parameters to the filtering module 9f. Using these parameters, the filtering module 9f sequentially performs the first to the fourth processes for filtering the input image data and generating the output image data, and stores the output image data in the output image data storage area 9s.

Step 60

The PDI module 9g issues to a printer driver, via the graphic interface, a drawing command for the output image data. At this time, the PDI module 9g refers to the print setting reference sign to reflect to the drawing command the print paper size and the layout, and the printer driver issues a print command to the printer 8, which in turn initiates the printing.

Figure 3:
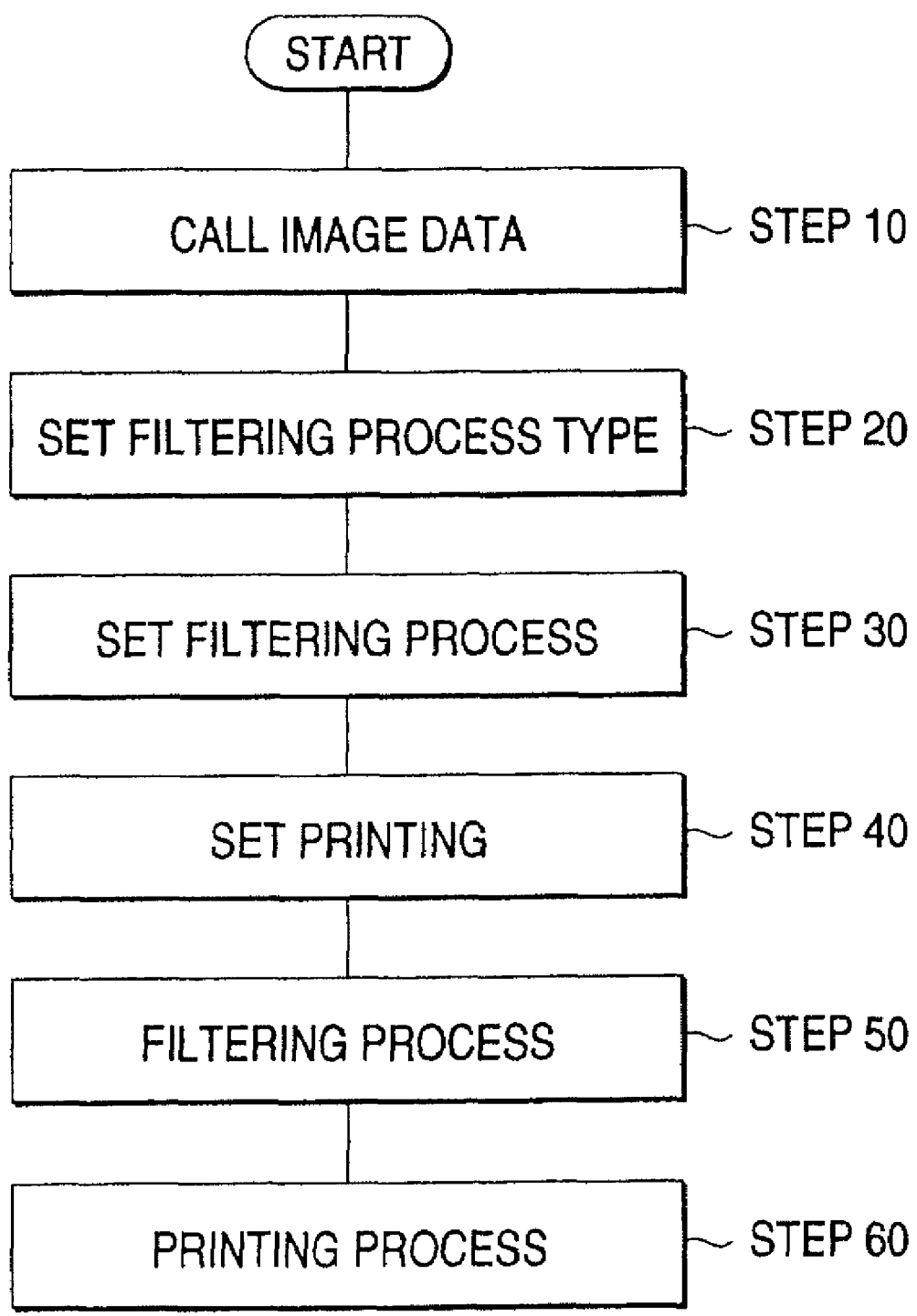
FIG. 3 is a flowchart showing the filtering processing performed by the image processing apparatus according to the embodiment.

The operation of the image processing apparatus 1 has been explained for the performance of the processing for filtering image data and for outputting the image data to the printer 8 in consonance with the procedures in FIG. 3.

According to the image processing apparatus of this embodiment, to set up the process for performing filtering, the results obtained by the simulated process are displayed on the screen in real time in accordance with the manipulations of the switches performed by an operator. Therefore, the operator can specify the performance of filtering while confirming the results of the simulated process.

Further, regardless of the order in which the operator sets the filtering processes at STEPs 20 and 30, a variety of filtering processes are performed in a predetermined order by referring to the tone curve setting reference sign, the saturation reference setting sign, the sharpness setting reference sign, the texture reference setting sign and the print setting reference sign, all of which are stored in the input value storage area 9p. Thus, various kinds of filtering processes can be performed in the order that can best improve the quality of output images. In other words, high quality images can consistently be output.

In addition, since the tone curve correction (first process for performing filtering) for an RGB model, the saturation correction (second process) for an HSB model and the spacial filtering process (third process) are performed in the named order, the reduction of color information and the spacial information can be minimized. Furthermore, a special process (a fourth process) that does not depend on the original image can be performed after the processes (the first to the third processes) that depend on the original image, while the operator can obtain a desired output image quality based on the image of a pickup object that he or she observes.

Moreover, since the order for performing the filtering processes for the input image data matches the order for performing the filtering processes for the reduced image data, the filtering effects appearing on an image in a display can approximate the filtering effects appearing on an image output to the printer 8.

Also, since the image data obtained by reducing the input data are employed for the simulated process, and since the size of the reduced image data is smaller than the size of the input image data, the results obtained by the simulated processing can be quickly displayed on the screen for setting up the filtering.

In this embodiment, the image data are finally transmitted to the printer 8. However, instead of transmitting the image data to the printer 8, the image data may be stored on an auxiliary storage device, such as the hard disk 5. The storage locations of the data entered upon the execution of each module, the data finally output and the data output during the process are not limited to the RAM 3. A part of these data may be stored in the register of the CPU 2, instead of the RAM 3. Further, the preview image data storage area 9t may not be acquired in the RAM 3, and preview image data may be output directly to the video memory 41.

A computer readable medium, such as a compact disk or a floppy disk, may be employed to distribute the image processing application 9. Further, such a processing program may be recorded at a terminal computer when a server machine transmits a carrier to a communication line by Internet.

What is claimed is:

1. An image processing apparatus, comprising:
a storage unit, in which input image data corresponding to a thumbnail image selected by a user is stored;
a reduced image displaying unit, generating reduced image data by thinning the input image data and storing the reduced image data in the storage unit, the reduced image displaying unit displaying reduced image corresponding to the reduced image data on a display;
a simulated parameter calculating unit, storing, in the storage unit, a first filter setting set by using the reduced image displayed on the display and calculating a simulated parameter based on the first filter setting;
a simulated image displaying unit, generating simulated image data by performing filler processing to the reduced image data in reference to the simulated parameter and displaying a simulated image corresponding to the simulated image data on the display;
a parameter calculating unit, calculating a parameter based on the first filter setting; and
a filter processing unit, generating output image data by performing filler processing to the input image data in reference to the parameter.

2. The image processing apparatus according to claim 1, wherein the number of pixels of the reduced image data is larger than the number of pixels of thumbnail data of the input image data.

3. The image processing apparatus according to claim 1, wherein:
the first filter setting includes a first setting and a second setting,
the second setting is utilized for performing the filter processing to the input image data after the first setting is utilized for performing the filler processing to the input image data, and
the parameter is calculated based on the second setting.

4. The image processing apparatus according to claim 1, wherein:
before storing the first filter setting in the storage unit, a second filler setting is stored in a first area of the storage unit, and
the first filter setting is stored in a second area of the storage unit which is different from the first area.

5. The image processing apparatus according to claim 4, wherein
when receiving an instruction for canceling the first filter setting, the simulated parameter is calculated based on the second filter setting.

6. An image processing method, comprising:
- generating reduced image data by thinning input image data corresponding to a thumbnail image stored in a storage unit and selected by a user;
- storing the reduced image data in the storage unit;
- displaying reduced image corresponding to the reduced image data on a display;
- storing, in the storage unit, a first filter setting set by using the reduced image displayed on the display;
- calculating a simulated parameter based on the first filter setting;
- generating simulated image data by performing filter processing to the reduced image data in reference to the simulated parameter;
- displaying a simulated image corresponding to the simulated image data on the display;
- calculating a parameter based on the first filler setting; and
- generating output image data by performing filter processing to the input image data in reference to the parameter.

7. The image processing method according to claim 6, wherein the number of pixels of the reduced image data is larger than the number of pixels of thumbnail data of the input image data.

8. The image processing method according to claim 6, wherein:
- the first filter setting includes a first setting and a second setting,
- the second setting is utilized for performing the filter processing to the input image data after the first setting is utilized for performing the filler processing to the input image data, and
- the parameter is calculated based on the second setting.

9. The image processing method according to claim 6, wherein:
- before storing the first filter setting in the storage unit, a second filter setting is stored in a first area of the storage unit, and
- the first filter setting is stored in a second area of the storage unit which is different from the first area.

10. The image processing method according to claim 9, wherein
- when receiving an instruction for canceling the first filter setting, the simulated parameter is calculated based on the second filter setting.

11. A computer-readable recording medium in which a computer program causing a computer to execute the method according to claim 6 is recorded.

12. A computer-readable recording medium in which a computer program causing a computer to execute the method according to claim 7 is recorded.

13. A computer-readable recording medium in which a computer program causing a computer to execute the method according to claim 8 is recorded.

14. A computer-readable recording medium in which a computer program causing a computer to execute the method according to claim 9 is recorded.

15. A computer-readable recording medium in which a computer program causing a computer to execute the method according to claim 10 is recorded.

* * * * *